June 1, 1954  J. S. ROBBINS  2,680,034
STRUCTURAL JOINT
Filed Dec. 26, 1951
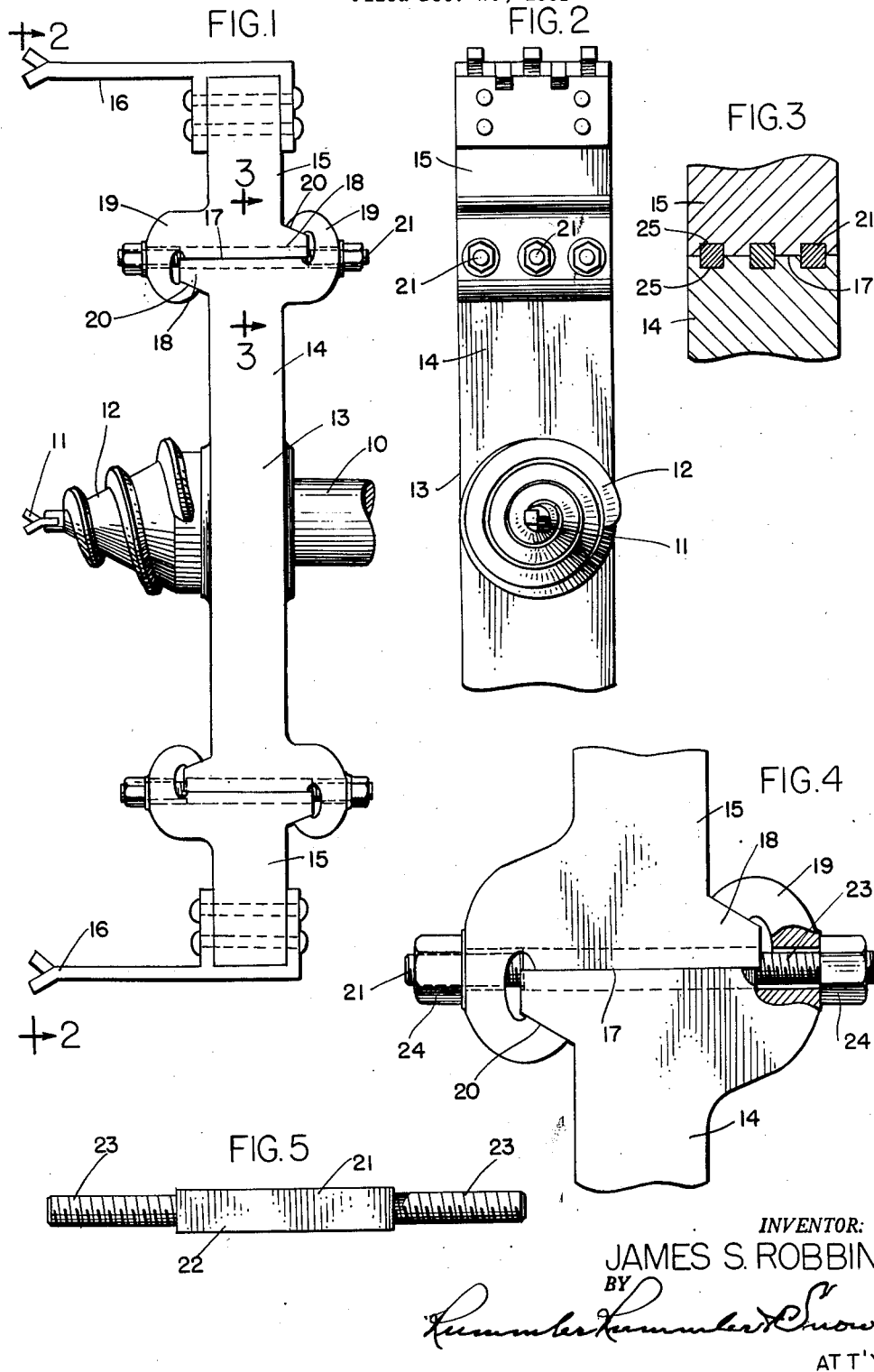
INVENTOR:
JAMES S. ROBBINS
BY
Rummler Rummler & Snow
ATT'YS Patented June 1, 1954

2,680,034

UNITED STATES PATENT OFFICE 2,680,034

STRUCTURAL JOINT

James S. Robbins, Highland Park, Ill., assignor to Goodman Manufacturing Company, Chicago, Ill., a corporation of Illinois Application December 26, 1951, Serial No. 263,339

1 Claim. (Cl. 287—103)

This invention relates to structural joints useful for connecting parts that have to withstand great strains when joined and have to be readily separable. The invention is a specific improvement upon the subject matter of my copending application, Serial No. 151,851 filed March 25, 1950, now Patent No. 2,587,065.

The main objects of this invention are to provide an improved form of tool-mounting structure particularly adapted for use in coal-mining machinery of the tunnel-cutting type where the manipulation of the machine requires parts to be retractable or removable; and to provide a mounting of this type which is especially adapted for attaching tools to the rotary arms of a coal-mining machine of the type shown in my copending application for patent, Serial No. 44,341 filed August 14, 1948, now Patent No. 2,550,202.

A specific embodiment of this invention is shown in the accompanying drawings in which:

Figure 1 is a side elevation of the power shaft and tool-carrying arms of a rock-boring machine in which the tool-carrying ends of the arms are removably attached to the body portions of the arms by means of a joint constructed according to this invention.

Fig. 2 is a fragmentary front face view of the same.

Fig. 3 is a sectional detail on the line 3—3 of Fig. 1.

Fig. 4 is an enlarged fragmentary side elevation of the joint, partly broken away.

Fig. 5 is a detail showing the construction of the bolt by means of which the structural parts are locked together in rigid connection.

In the drawings, the power shaft 10 has a pilot bit 11 at its forward end and also carries a breaker 12 of conical form, in position to follow the pilot bit into the face of the rock that is being worked upon. Rearward of the pilot bit and cone 12 and fixedly mounted on the shaft 10 is a tool carrier 13 which comprises radiating arms each made up of separable members 14 and 15 that are attached end-to-end by means of my improved joint structure. The end members 15 carry cutting tools 16 for cutting circular kerfs in the rock face through the rotation of the shaft 10 and the forward travel of the frame on which the shaft 10 is journaled.

In the improved joint, the members 14 and 15 abut each other end-to-end in a plane substantially at right angles to the radial dimension of the carrier arms, the planar meeting surfaces being indicated by the line 17 in the drawings. The meeting ends of the members 14 and 15 are identical in structure but are inverted with respect to each other.

Each member has at one side, adjacent the planar surface 17, a laterally extending flange 18 and at its opposite side a hook-shaped flange 19 which overhangs its planar surface 17 so as to engage the lateral flange 18 of the other member. The complementary abutting surfaces 20 of these flanges are inclined so that they have wedging engagement with each other when the members 14 and 15 are drawn together by the bolts 21.

The shanks of the bolts 21 are preferably of rectangular cross-section throughout the intermediate portion 22 of their length and are reduced to circular section and threaded at their end portions 23. The hooked flanges 19 are bored to receive the threaded ends of the bolts 21 and have bosses for the nuts 24 to bear upon.

The planar end surfaces of the members 14 and 15 have registering grooves 25 shaped to form key seats that fit the rectangular shanks of the bolts 21 and lock the members 14 and 15 against transverse shifting.

The pressure of the nuts 24 against the hooked flanges causes the wedging engagement of the flanges 18 and 19 to clamp the members 14 and 15 firmly together in their end-to-end relation; and the fit of the bolt shanks in the registering keyway grooves locks the members 14 and 15 against the shifting laterally of the bolts.

The joint shown is of great strength in resisting strains in any direction but can be readily separated by merely removing the nuts at one end of the bolts and then sliding the members apart on their abutting surfaces 17 in the direction of the length of the bolts. This joint has great utility in environments such as arise in coal-mining operations where access to the joint is extremely limited, since it merely requires the removal of the nuts from either end of the bolts to enable the parts to be readily separated.

It will be understood that details of the construction shown and described can be altered or omitted without departing from the spirit of the invention as defined by the following claim.

I claim:

A structural joint, comprising a pair of similar members, each having a planar end surface abutting against that of the other, each having an integral flange extending outward therefrom on one side adjacent its said planar surface, and each having an integral hook on its opposite side overhanging its said planar surface, said flanges and hooks being formed for interfitting wedging engagement for drawing said surfaces one against the other, each of said members having a groove extending across its said planar surface between its said flange and hook, said grooves registering to form a keyway, said hooks having bores alined with said grooves, and a bolt fitting said keyway and extending through said hooks and said keyway to clamp said members in interlocking relation.

References Cited in the file of this patent

UNITED STATES PATENTS

| Number | Name | Date |
|---|---|---|
| 623,574 | Smith et al. | Apr. 25, 1899 |
| 2,587,065 | Robbins | Feb. 26, 1952 |